(12) United States Patent
Mathew et al.

(10) Patent No.: US 7,483,870 B1
(45) Date of Patent: Jan. 27, 2009

(54) FRACTIONAL DATA SYNCHRONIZATION AND CONSOLIDATION IN AN ENTERPRISE INFORMATION SYSTEM

(75) Inventors: Ashwin J. Mathew, Karnataka (IN); Subhashini Subramaniam, Karnataka (IN)

(73) Assignee: Sun Microsystems, Inc., Santa Clara, CA (US)

( * ) Notice: Subject to any disclaimer, the term of this patent is extended or adjusted under 35 U.S.C. 154(b) by 455 days.

(21) Appl. No.: 10/767,380

(22) Filed: Jan. 28, 2004

(51) Int. Cl.
*G06F 7/00* (2006.01)
*G06F 17/00* (2006.01)
*G06F 15/16* (2006.01)

(52) U.S. Cl. ............................. 707/1; 707/100; 707/103
(58) Field of Classification Search ................... 707/100
See application file for complete search history.

(56) References Cited

U.S. PATENT DOCUMENTS

| | | | |
|---|---|---|---|
| 5,913,214 | A | 6/1999 | Madnick et al. |
| 5,963,933 | A | 10/1999 | Cheng et al. |
| 6,295,541 | B1 | 9/2001 | Bodnar et al. |
| 6,493,721 | B1 | 12/2002 | Getchius et al. |
| 6,526,284 | B1 | 2/2003 | Sharp et al. |
| 6,609,123 | B1 * | 8/2003 | Cazemier et al. ............... 707/4 |
| 6,847,984 | B1 | 1/2005 | Midgley et al. |
| 6,941,326 | B2 | 9/2005 | Kadyk et al. |
| 7,007,041 | B2 | 2/2006 | Multer et al. |
| 7,010,540 | B2 | 3/2006 | Sturms |
| 7,117,264 | B2 | 10/2006 | Becker et al. |
| 7,177,950 | B2 | 2/2007 | Narayan et al. |
| 7,181,746 | B2 | 2/2007 | Perycz et al. |
| 7,185,076 | B1 | 2/2007 | Novaes et al. |
| 2002/0165724 | A1 * | 11/2002 | Blankesteijn ................... 705/1 |
| 2002/0184213 | A1 | 12/2002 | Lau et al. |
| 2002/0188656 | A1 | 12/2002 | Patton et al. |
| 2003/0061365 | A1 | 3/2003 | White et al. |
| 2003/0084056 | A1 | 5/2003 | DeAnna et al. |

(Continued)

FOREIGN PATENT DOCUMENTS

WO    WO-01/35211 A2    5/2001

OTHER PUBLICATIONS

NG, Wee Siong et al, "PeerDB: A P2P-based System for Distributed Data Sharing," published in 2003 by the 19th International Conference on Data Engineering, pp. 633-644.*

(Continued)

*Primary Examiner*—Tony Mahmoudi
*Assistant Examiner*—Paul Kim
(74) *Attorney, Agent, or Firm*—Osha · Liang LLP

(57) ABSTRACT

Methods and systems for automatically updating data within a peer-to-peer enterprise information system. A change for a source data type is published over broadcast channel. The data change is received at a join engine peer and, in response to receiving the data change, the join engine peer consults a global attribute object model for identifying a dependent output entity (one that includes the same attribute as that of the data change) and for identifying additional attributes for forming a modified attribute set for the output entity. In response to discovering the output entity, a query is generated that is directed to a source system that includes the additional attributes for forming the modified attribute set. Upon receiving a response from the source system, the join engine peer automatically forms the modified attribute set and publishes it to an output source system associated with the output entity.

30 Claims, 10 Drawing Sheets

U.S. PATENT DOCUMENTS

| | | | |
|---|---|---|---|
| 2003/0120672 A1* | 6/2003 | Bingham | 707/100 |
| 2003/0126199 A1 | 7/2003 | Kadri et al. | |
| 2003/0217171 A1 | 11/2003 | Von Stuermer et al. | |
| 2004/0073533 A1 | 4/2004 | Mynarski et al. | |
| 2004/0148304 A1 | 7/2004 | Hempstead et al. | |
| 2004/0172592 A1 | 9/2004 | Collie et al. | |
| 2004/0181575 A1 | 9/2004 | Mallberg et al. | |
| 2004/0249830 A1 | 12/2004 | Sonkin et al. | |
| 2005/0021575 A1 | 1/2005 | Boyd et al. | |
| 2006/0101422 A1 | 5/2006 | Bourges-Waldegg et al. | |

OTHER PUBLICATIONS

Celik, A. et al. "I-DG:A Secure Protocol For Disseminating Data to Subscribers Via IP Mulicast" Advanced Issues of E-Commerce and Web-Based Information System, 2002. (WECWIS 2002). Proceedings. Fourth IEEE International Workshop on Jun. 26-28, 2002, Piscataway, NJ, USA, IEEE, Jun. 26, 2002, pp. 1-8.

Grufman, S., et al. "Distributing semantic constraints between heterogeneous databases" Data Engineering, 1997. Proceedings. 13th International Conference on Birmingham, UK Apr. 7-11, 1997, Los Alamitos, CA, USA. IEEE Comput. Soc. US, Apr. 7, 1997, pp. 33-42.

Turker C., et al. "Towards maintaining integrity of federated databases" Information Technology, 1997. BIWIT '97., Proceedings of the Third Basque International Workshop on Biarritz, France Jul. 2-4, 1997, Los Alamitos, CA, USA, IEEE Comput. Soc. US, Jul. 2, 1997, pp. 93-100.

Bailey, James, et al. "Active Databases and Agent Systems__A Comparison" Technical Report 95-10, 1995, pp. 1-18.

Mukhopadhyay, D., et al. "Practical Approaches to Maintaining Referential Integrity in Multi-databases Systems." Research Issues in Data Engineering, 1993: Interoperability in Multidatabase Systems, 1993. Proceedings RIDE-IMS '93., Third International Workshop on Vienna, Austria Apr. 19-20, 1993, Los Alamitos, CA, USA, IEEE Comput.Soc.US. Apr. 19, 1993, pp. 42-49.

Kamel, M.N., et al. "The Federated Database Management System: An Architecture of Distributed Systems for the 90's." Distributed Computing Systems, 1990. Proceedings., Second IEEE Workshop on Future Trends of Cairo, Eqypt Sep. 30-Oct. 2, 1990, Los Alamitos, CA, USA, IEEE Comput.Soc., US, Sep. 30, 1990, pp. 346-352.

European Search Report dated Aug. 12, 2005 (5 pages).

* cited by examiner

Prior Art Figure 1

FRACTIONAL DATA SYNCHRONIZATION AND CONSOLIDATION IN AN ENTERPRISE INFORMATION SYSTEM

RELATED U.S. APPLICATIONS

This application is related to U.S. patent application Ser. No. 10/767,381 by Ashwin J. Mathew and Amit P. Tripathi, filed on the same date as the present application, entitled "Synchronizing and Consolidating Information from Multiple Source Systems of a Distributed Enterprise Information System", assigned to the assignee of the present invention and incorporated herein by reference.

This application is related to U.S. patent application Ser. No. 10/767,083 by Ashwin J. Mathew and Amit P. Tripathi, filed on the same date as the present application and entitled "Global Attribute Mapping Data in an Enterprise Information System", assigned to the assignee of the present invention and incorporated herein by reference.

This application is related to U.S. patent application Ser. No. 10/767,165 by Amit P. Tripathi, filed on the same date as the present application and entitled "Context Based Logging in a Distributed Architecture Computer System" assigned to the assignee of the present invention and incorporated herein by reference.

This application is related to U.S. patent application Ser. No. 10/767,502 by Amit P. Tripathi and Ashwin J. Mathew, filed on the same date as the present application and entitled "Batch Processing of Change Events in a Distributed Enterprise Information System", assigned to the assignee of the present invention and incorporated herein by reference.

This application is related to U.S. patent application Ser. No. 10/767,083 by Ashwin J. Mathew and Amit P. Tripathi, filed on the same date as the present application and entitled "Modeling and Performance of Data Transformations in a Distributed Enterprise Information System" th assigned to the assignee of the present invention and incorporated herein by reference.

This application is related to U.S. patent application Ser. No. 10/767,079 by Ashwin J. Mathew and Subhashini Subramaniam, filed on the same date as the present application and entitled "Sequencing of Data Consolidation and Synchronizing in an Enterprise Information System", assigned to the assignee of the present invention and incorporated herein by reference.

BACKGROUND OF THE INVENTION

1. Field of the Invention

Embodiments of the present invention relate to updating attributes of entities stored in an enterprise information system. More particularly, embodiments of the present invention relate generally to fractional consolidation and synchronization of data among specific stored entities dependent upon updated information within a system of distributed enterprise information systems.

2. Related Art

Typically source systems, such as databases (DBs), web servers etc., of enterprise information systems (EIS) have been used for storing and maintaining information. This information may be stored and maintained in the source systems by associating the information with data types. For example, referring to FIG. 1, Human Resources (HR) user 122, email user 142, and employee record 132 are examples of data types for which information (values for 124, 126, 144, 134, 136, 138) is stored and maintained in source systems 110. More specifically, HR user 122 may be used for storing and maintaining the first name 124 and last name 126 of a person. Similarly, an email user 142 may be used for storing and maintaining the email address 144 of a person, while an employee record 132 may be used for storing and maintaining the first name 134, last name 136, and email address 138 for a person.

The data types may be stored and maintained in separate source systems 110. For example, the information associated with the HR user 122 may be stored and maintained in a database (HR DB) 120 while the information associated with the email user 142 may be stored and maintained in an email DB 140. Similarly, the information associated with employee record 132 may be stored and maintained in a payroll database (DB) 130.

The modification of information associated with particular data types may impact information associated with other data types, thus, the information in the different data types which may reside in different source systems 110 may need to be synchronized. For example, an instance of HR user 122 in HR DB 120, an instance of employee record 132 in payroll DB 130, and an instance of email user 142 in email DB 140 may all store information for a particular person. In this case, if the last name 126 of the HR user 122 is modified from "Jones" to "Smith," for example, the employee record 132 and the email user 142 for the particular person may also need to be modified to reflect the change in name (referred to hereinafter as "synchronization").

FIG. 1 depicts one prior art approach to synchronizing information associated with various data types using a centralized server 170. Novell DirXML, SunONE Metadirectory 5, IBM Directory Integrator, WebMethods, SunONE Integration Server, and BEA Weblogic Integration are examples of products that provide synchronization and consolidation of information that is stored and maintained in different source systems using a centralized server architecture similar to that depicted in FIG. 1.

In a centralized server architecture, modified information is communicated from the source systems 110 that store and maintain information to the centralized server 170 using connector views 150, which are associated with the source systems 110, to the combiner 160. The combiner 160 determines what data types may be impacted by modified information. Centralized server 170 stores and maintains information for all of the data types from all of the source systems 110 associated with the enterprise information system 100; thus, centralized server 170 may be used for providing a "metaview," e.g., consolidated view, for all the information that is stored and maintained in the source systems 110.

Continuing the example, although HR DB 120 may have an instance of the HR user 122, payroll DB 130 may have an instance of employee record 132, and email DB 140 may have an instance of email user 142 for the particular person, the centralized server 170 may also have values for the union of attributes (e.g., first name, last name, email address) for the particular person. Assuming, that HR DB 120 only includes an instance of HR user 122, payroll DB 130 only includes an instance of employee record 132, and email DB 140 only includes an instance of email user 142 for the particular person, then the "metaview" may include the value (e.g., "Jane") of first name 172, the value (e.g., "Jones") of last name 174, and the value (e.g., "Jane.Jones@sun.com") of the email address 176 for the particular person, thus, the "metaview" provides a way of seeing all the information that is stored and maintained in the source systems 110.

When modified information is communicated to the centralized server 170, the information is stored in the centralized server 170 and communicated back to the source systems 110, which may need to synchronize the information based on the modification. The information may be communicated from the centralized server 170 to the source systems 110 through the combiner 160 and the connector views 150.

Continuing the example of a particular person's last name being modified from "Jones" to "Smith," the last name 126, LN 136, and last name 174 may need to be updated for the particular person in the source systems 110 and the centralized server 170. Similarly, assuming that email address is formed, for example, as a concatenation of "first name," ".", "last name," and "@sun.com," the values of the email addresses (138, 144) associated with the email user 140 and employee record 132 may also need to be updated in the source systems 110 and the centralized server 170.

In this case, assume that the last name 126 of HR user 122, which is stored in HR DB 120, is first modified from "Jones" to "Smith." The new value (e.g., "Smith") for last name 126 may be communicated to the connector view CV1, which is associated with HR DB 120. CV 1 in turn communicates the new value to the combiner 160, which determines that the employee record 130 and the email user 140 may be impacted. The old value (e.g., "Wright") for the last name 174 in centralized server 170 is replaced with the new value (e.g., "Smith") for the last name 126 of HR user 122. Similarly, the value of email address 176 is also modified in the centralized server 170.

Although the centralized server 170's information (172, 176) has been synchronized, the source system 110's information (136, 138, 144) has not been synchronized yet. Thus, the modifications to last name 174 and email address 176 are communicated from the centralized server 170 to the combiner 160. The combiner 160 communicates the modifications to the last name 174 and email address 176 to the connector view CV2, which communicates the modifications to payroll DB 130. Payroll DB 130 updates the instance of employee record 132 based on the modifications it receives. Similarly, combiner 160 communicates the modifications of the email address 176 to the connector view CV3, which communicates the modifications to email DB 140. Email DB updates the instance of email user 142 based on the modifications it receives. After all of the synchronizations have been performed, last name 126, LN 136, and last name 179 are set to the value "Smith." Similarly, email address 138, email address 144, and email address 176 are set to the value "Jane.Smith@sun.com."

The centralized server approach of the prior art may have numerous disadvantages. For example, the centralized server 170 becomes a performance bottle-neck as all modifications to information that is stored and maintained in source systems 110 must be communicated to the centralized server 170 in order to perform data synchronization and consolidation. Further, the centralized server architecture of FIG. 1 cannot be scaled horizontally e.g., by adding additional server systems. Instead, the centralized server architecture can only be scaled vertically e.g., by increasing the power of the server system that executes the centralized server 170.

SUMMARY OF THE INVENTION

By utilizing a system of peer-to-peer enterprise information systems for performing data consolidation and synchronization, the scaling concerns may be eliminated. However, when performing data consolidation and synchronization among entities stored in disparate enterprise information systems, data may have to be retrieved from various related source entities and then transformed in order to form an output entity. The problem is how to ensure that when performing updates on an entity, only the updated attributes of the entity are propagated to other entities that depend on the values of these updated attributes, taking into account only the required set of queries and transformations for the updated entity's modified attributes. Also, to make joins more efficient, only those queries that are required to perform or generate the output data are performed.

Accordingly, in a system having no centralized server, e.g., a peer-to-peer enterprise information system, it is desirable to provide an automated method and system for determining what source entities are used to form an output entity. In one embodiment, one or more global attribute object models are used to make this determination and output attributes are recorded as functions of the input source data. When changes occur to a source entity, the corresponding object model(s) will be invoked by a join engine peer(s). The join engine peer(s) in turn sends queries to retrieve other source entities involved in the join, and then transforms the data retrieved in order to form the output entity. The output entity is then published to the enterprise information system(s) that hold this output entity. Only those sources that are required to form the output attributes are queried in what may be called a fractional synchronization.

In addition to the set of source entities, according to one embodiment of the present invention, the output entity and transformations to be applied, the dependencies between output entity attributes and source entity attributes are also captured in the object model. When a change occurs to a source entity, it is first determined which attributes of the output entity have dependencies on the modified attributes of the updated source entity (output entity's modified attribute set). In one embodiment, the output attributes may be recorded as functions of the input source attributes to determine data depending thereon.

In one embodiment, attributes of the output entity that form its primary key are added to the modified attribute set, regardless of whether they have been modified, This is because the primary key information is needed by the enterprise information systems holding the output entity when the modified entity is updated into the data stores.

According to one embodiment, when it is discovered which other entities are required to form the set of output attributes to be formed, queries are sent to retrieve the set of source entities needed to form the output entity's modified attribute set. Only those source entities to which the output is dependent are queried. Then, only the transformations needed to form the modified attribute set of the output entity are performed, and the modified attribute set is published to the enterprise information systems holding the output entity.

Specifically, one embodiment of the present invention provides an automatic method for updating data within a peer-to-peer enterprise information system. The method may commence when a change for a source data type is published over a peer-to-peer broadcast channel. The data change is received at a join engine peer and, in response to receiving the data change, the join engine peer consults a global attribute object model for identifying a dependent output entity (one that includes the same attribute as that of the data change) and for identifying additional attributes for forming a modified attribute set for the output entity. In response to discovering the output entity, a query is generated that is directed to only those source systems or system that includes the additional attributes for forming the modified attribute set. Source systems that are not required to generate the output data are not queried. The selection of source entities to query is based on attribute dependencies that are established with respect to the output attributes. Upon receiving a response from the source system, the join engine peer automatically forms the modified attribute set and publishes it to an output source system associated with the output entity.

In one embodiment, a data transformation is performed for the published data change. The data transformation is performed by the join engine peer and involves automatically transforming the data change into a transformation script of a transformation language for implementation by the join engine peer. Only the required set of transformations, e.g., transformations required to form the modified attribute set of the output entity, are performed.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF THE INVENTION

Figure 1:
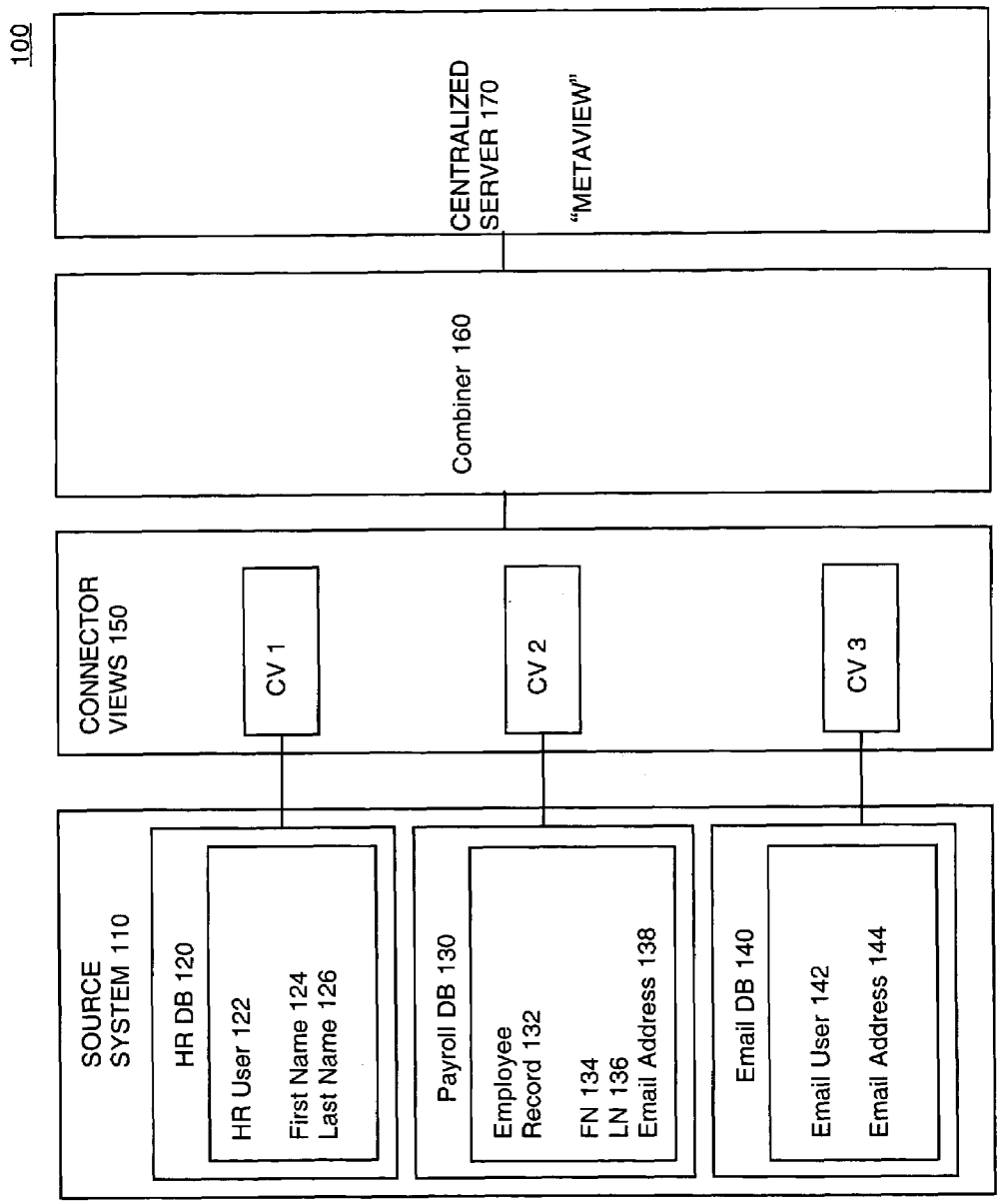
FIG. 1 is a block diagram of a prior art method for synchronizing and consolidating information from multiple source system using a centralized server.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic information capable of being stored, transferred, combined, compared, and otherwise manipulated in a computer system. It has proven convenient at times, principally for reasons of common usage, to refer to these information as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading," "transforming," "performing," "broadcasting," "creating," "joining," "adapting," "receiving," "closing," "enabling," "generating," "logging," "tracing," "modifying", "assigning," or the like, refer to actions and processes of a computer system or similar electronic computing device. The computer system or similar electronic computing device manipulates and transforms data represented as physical (electronic) quantities within the computer system memories, registers or other such information storage, transmission or display devices.

Figure 4:
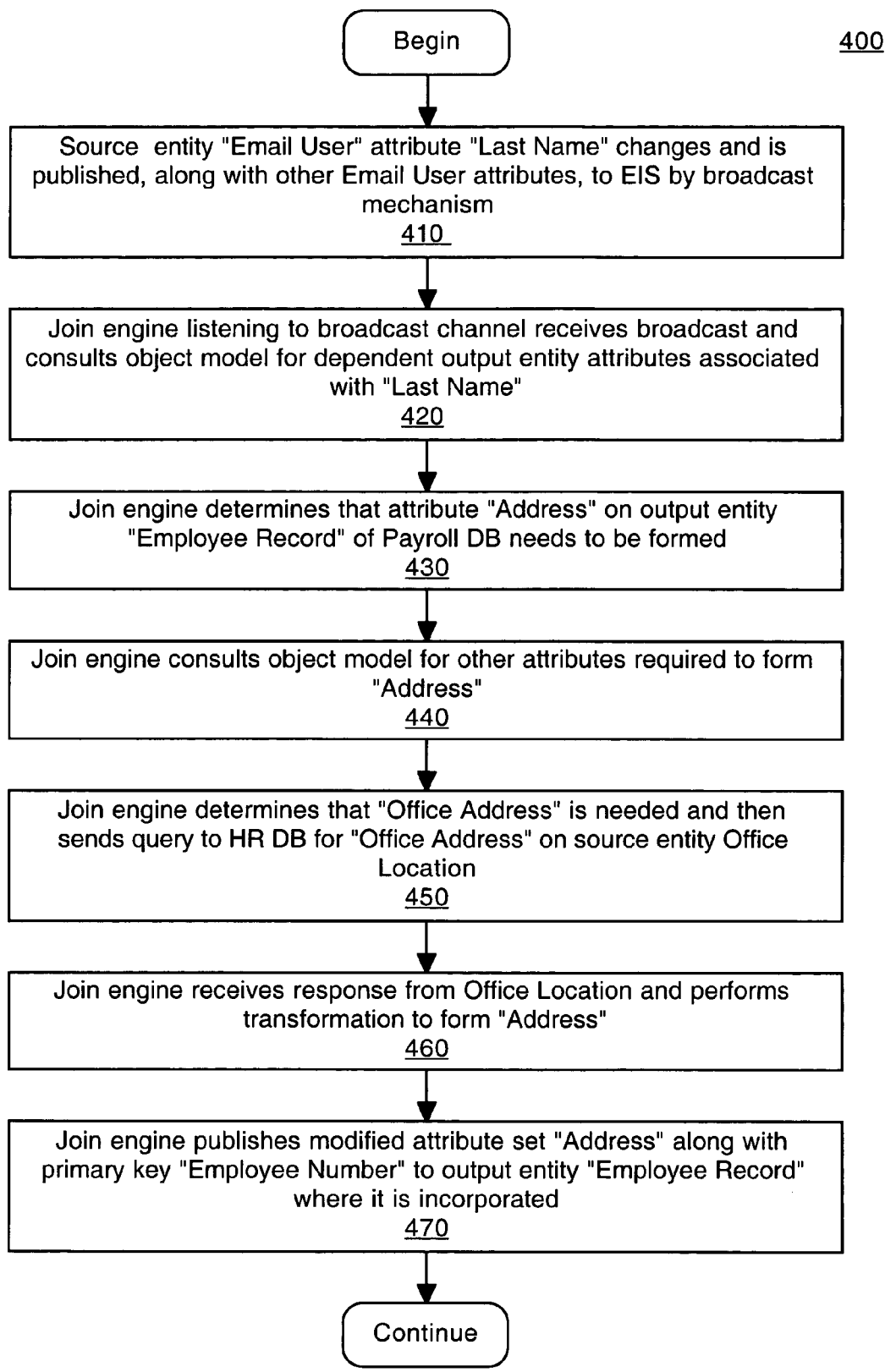
FIG. 4 is a computer implemented flow chart for an exemplary fractional data synchronization and consolidation process resulting from a change event that may occur in a peer-to-peer based enterprise information system, according to one embodiment of the present invention.
Figure 6A:
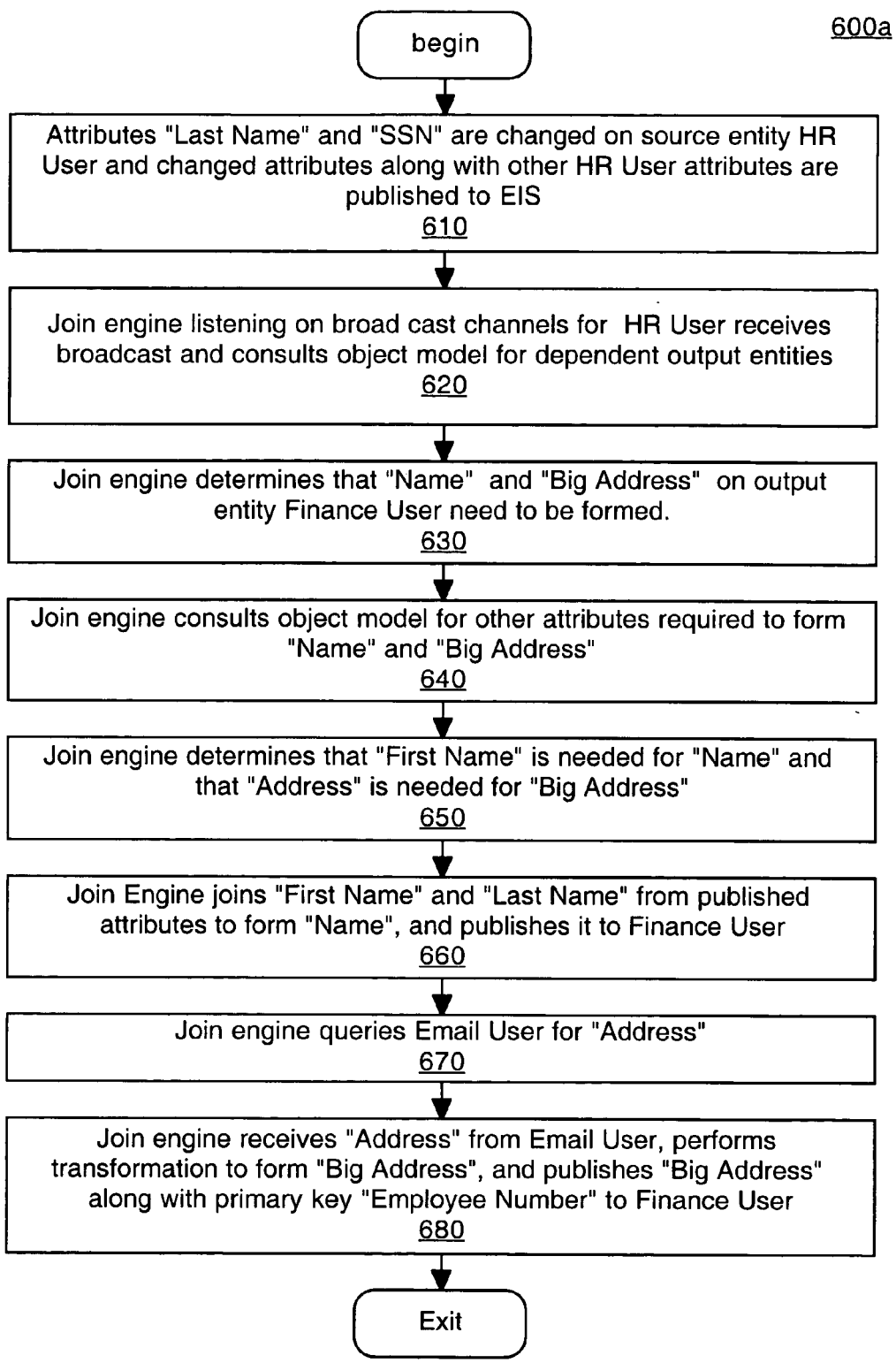
FIG. 6A is a computer implemented flow chart for an exemplary fractional data synchronization and consolidation process resulting from multiple change events that may occur in a peer-to-peer based enterprise information system, according to one embodiment of the present invention.
Figure 6B:
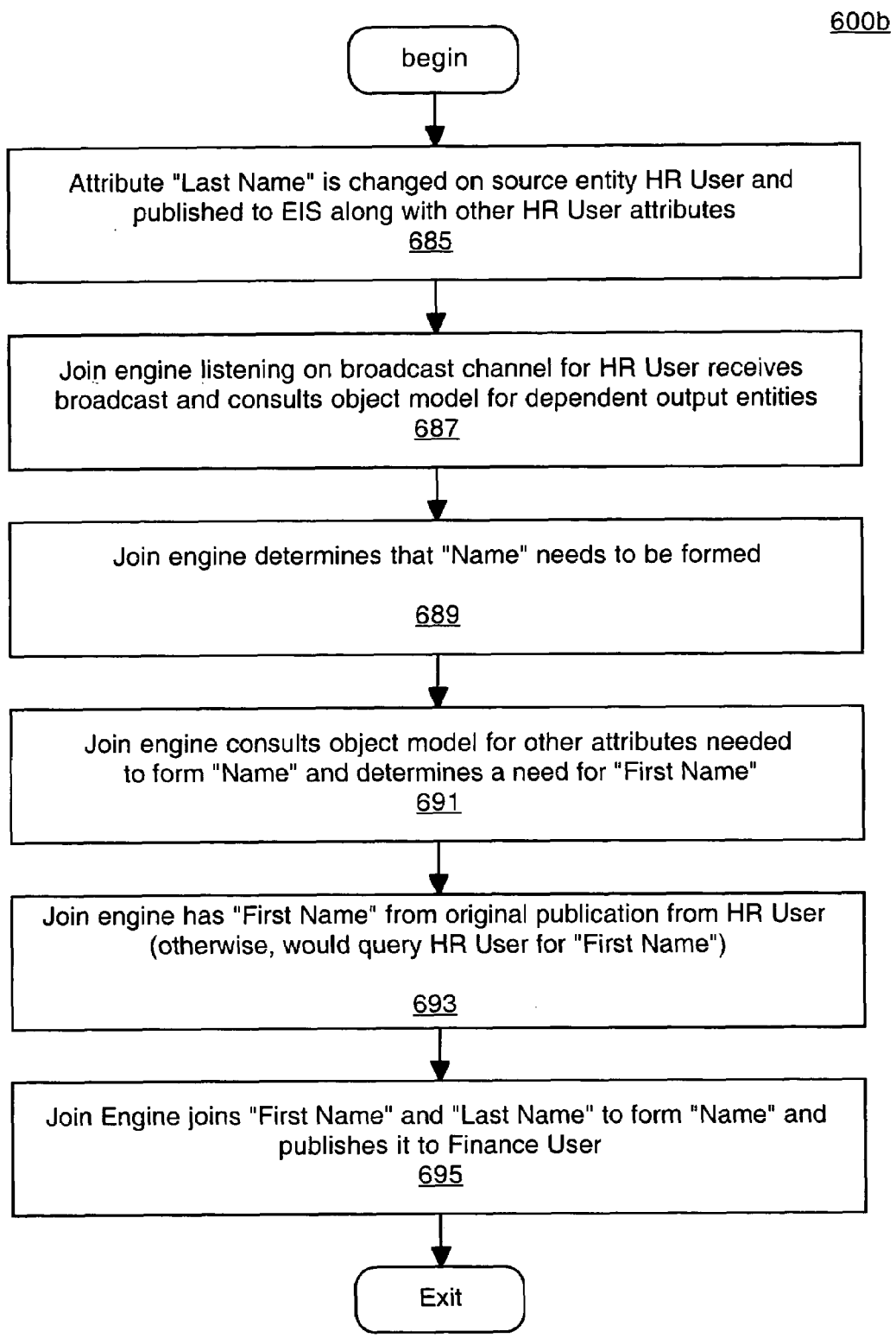
FIG. 6B is a computer implemented flow chart for an exemplary fractional data synchronization and consolidation process resulting from a single change event that may occur in a peer-to-peer based enterprise information system, according to one embodiment of the present invention.

Certain portions of the detailed descriptions of embodiments of the invention, which follow, are presented in terms of processes and methods (e.g., method 400 of FIG. 4, 600*a* of FIG. 6A and 600*b* of FIG. 6B). Although specific steps are disclosed herein describing the operations of these processes and methods, such steps are exemplary. That is, embodiments of the present invention are well suited to performing various other steps or variations of the steps recited in the flowcharts of the figures herein.

Although embodiments of the present invention are presented in terms of a specific peer-to-peer enterprise information system, it should be understood that embodiments of the present invention are suitable for any distributed architecture computer system application.

Figure 2:
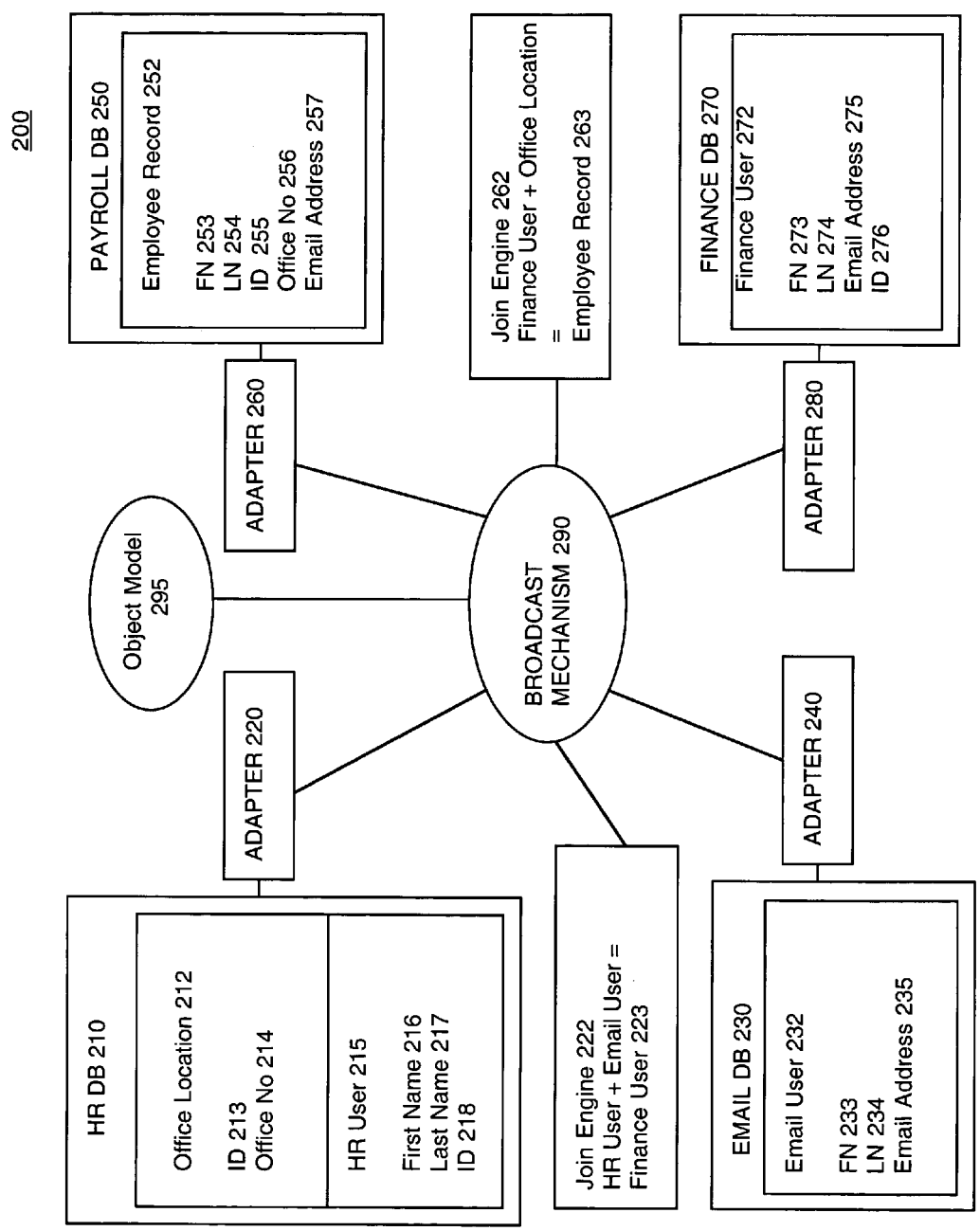
FIG. 2 is a block diagram illustrating a peer-to-peer based enterprise information system for synchronizing and/or consolidating information from multiple sources in accordance with embodiments of the present invention.

FIG. 2 is a block diagram illustrating an exemplary enterprise information system 200 for synchronizing and/or consolidating information from multiple sources and performing transformations in accordance with embodiments of the present invention. An exemplary enterprise information system 200 for synchronizing and/or consolidating information from multiple sources and performing transformations in accordance with embodiments of the present invention. Enterprise information system 200a includes multiple source systems (210, 230, 270, 250), which store and maintain information (values for 216, 217, 218, 233, 234, 235, 273, 274, 275, 276, 213, 214 253, 254, 255, 256, 257) associated with instances of data types (212, 232, 272, 252). Modifications to the information, e.g., change events, may be synchronized across instances of related data types by broadcasting the information on the peer-to-peer broadcast mechanism 290 as well as listening for and receiving the modified information from the broadcast mechanism 290. Broadcasting is a technique that is well known in the art.

Object model 295 in FIG. 2 provides a "blueprint" for traversing between different data types and attributes in the system and includes, in one embodiment, indications of data dependencies between source attributes and generated or output attributes. Object model 295 specifies how data types and their attributes are related to each other and is globally available to any peer in the system. For example, join engine 222 may need to know how to query Email user 232 to form a new attribute. Join engine 222 would obtain the answer as to how to form its query from object model 295. The relationship between data types and attributes as specified in the object model 295 is referred to herein as global attribute mapping data. As discussed further below, join engines may consult or access the object model 295 in performing fractional data synchronization and consolidation.

In the present embodiment, modified information may be broadcast by adapters (220, 240, 280, 260) that are associated with the source systems (210, 230, 270, 250). Adapters are peers in the peer-to-peer system. The adapters (220, 240, 280, 260) may listen for and receive modified information that is broadcast. In one embodiment, information may be provided, listened for, received, and/or requested on channels that are dedicated to particular data types or to particular join engines, as will be described in more detail.

In one embodiment, information associated with one data type may be concatenated with information associated with another data type as a part of synchronizing the information associated with the data types. Join engines (222, 262) of FIG. 2 are also peers, along with adapters, in the peer-to-peer system. In the present embodiment, join engines (222, 262) may use join specifications (223, 263) to synchronize information associated with multiple source systems (210, 230, 270, 250) and to perform data transformations.

For example, a join specification 223 (e.g., HR user+email user=finance user) indicates that finance user 272 is a consolidation or concatenation of HR user 215 and email user 232. In other words, finance user 272 includes attributes (FN 273, LN 274, ID 276) that correlate to attributes of HR user 215 (first name 216, last name 217, ID 218) and attributes (email address 275) that correlate to attributes of email user 232 (email address 235). If the information associated with either HR user 215 or email user 232 is modified, join engine 222 may use join specification 223 to synchronize the information associated with finance user 272 by obtaining (e.g., through queries) the latest information for HR user 215 and email user 232 and providing the latest information to finance DB 270. The latest information may be broadcast on the broadcast mechanism 290 using channels and adapters as will be described in more detail.

In the present embodiment, adapters (220, 240, 260, 280) and join engines (222, 262) may be "peers" that communicate using peer-to-peer broadcast mechanism 290. In one embodiment, adapters and join engines may be implemented as peer processes which may or may not reside on separate computer systems.

In one embodiment, adapters and join engines may be partitioned. For example, referring to FIG. 2, adapter 220 may, among other things, provide channels dedicated to providing information associated with HR user 215 and office location 212. Adapter 220 may be partitioned into two adapters. In this case, for example, one of the adapters may provide a channel dedicated to providing information associated with a particular data type, e.g., HR user, and the other adapter may provide a channel for providing information associated with office location 212, another data type. Similarly, a join engine that handles two join specifications may be partitioned into two join engines (222, 262) where each join engine handles one of the join specifications.

Although FIG. 2 depicts join engines with one join specification (223, 263), each join engine may handle more than one join specification.

In one embodiment, queries may be associated with requests for information associated with data types. Adapters and join engines may obtain the information associated with the data types by monitoring the appropriate channel. For example, a join engine may request information (e.g., a query) for a particular data type on a channel that is dedicated to requesting information for a specific data type. The request may include a query for the information. An adapter for a source system that stores and maintains the information of the requested data type may listen for and receive the request. The query may be executed on the source systems to obtain the information. The source system may, in one embodiment, provide the information to the join engine by broadcasting it on a channel that is dedicated to the join engine that generated the query.

Implementing adapters and join engines as peers allows for distribution of the adapters and join engines across a set of server systems. Thus, multiple adapters and join engines may reside on the same server system or on separate server systems, depending on load requirements. Thus, a peer architecture, such as that depicted in FIG. 2, may be scaled vertically by increasing the processing power of the server systems on which the adapters and/or join engines reside. Similarly, the architecture may be scaled horizontally by partitioning adapters and join engines and executing the partitioned adapters and join engines on more server systems.

In one embodiment, modified information, e.g., change events, may be broadcast on channels that are dedicated to providing the information for the data type of the modification. Similarly, in one embodiment, modified information may be listened for and received on the channels that are dedicated to providing the information. In one embodiment, information associated with data types may be requested (e.g., queried) on channels (query channels) that are dedicated to the data type of the requested information. Similarly, in one embodiment, the requested information may be provided using query response channels that are dedicated to the peer that requested the information. According to one embodiment, Java Messaging Services (JMS) topics are used for providing information associated with data types on dedicated channels. In one embodiment, JMS queries are used for requesting and/or providing information associated with data types on dedicated channels.

In one embodiment, data types may be any structure that can be used for storing and maintaining values with a source system. In one embodiment, a source system may be a database, the data types may be tables, and instances of the data types may be rows of the table. In this case, attributes, such as HR user 214's first name 216, last name 217, and ID 218, may be columns of the table and values, such as the first name "Jane" and the last name "Smith," may be stored in data cells under the appropriate columns. In one embodiment a source system may be an object oriented database, the data types may be object classes, the attributes of the data types may be attributes of the object classes, and the instances of the data types may be objects that are associated with the object classes.

Although the present embodiment does not depict a centralized server for storing and maintaining a "metaview" that includes values for all of the information associated with the source systems, users may still be interested in accessing the values for all of the information associated with the source systems. In one embodiment, "consolidated views" provide users with the ability to access the values for all of the information associated with the source systems. However, the "consolidated views" may be implemented in a way that works with a peer architecture.

Referring to FIG. 2, for example, join engines (222, 262) with join specifications (223, 263) indicate how information associated with various data types (215, 232, 272, 212) may be consolidated or concatenated to provide "consolidated views" (e.g., finance user 272, employee record 252). For example, in the present embodiment, join specification 263 indicates that employee record is a concatenation of finance user and office location, thus, employee record 252 may be a "consolidated view" of finance user 272 and office location 212. More specifically, employee record 252 may include attributes (FN 253, LN 254, email address 257, ID 255) that correspond to attributes associated with finance user 272 (FN 273, LN 274, email address 275, ID 276) and attributes (ID 255, office no 214) that correspond to attributes associated with office location 212 (ID 213, office no 214). The data type that results from a data consolidation may be broadcast from the join engine over a data channel specific for that data type.

In one embodiment, global attribute mapping data, available from object model 295, may be used to determine the interrelationship of attributes. This information is made available globally and is readily consulted by join engine peers for determining dependency relationships between attributes. For example, if the value of the HR user 214's last name 217 is modified, email user 232's LN 234 may need to be synchronized based on the modification. In this case, global attribute mapping data may indicate that HR user 214's last name 217 is related to email user 232's LN 234. In one embodiment, a notation such as "HR user.last name=email user. LN" may be used to indicate that email user 232's LN 234 may be impacted by a modification to HR user 214's last name 217 or vice versa.

Similarly, email user 232's email address 235 may also need to be synchronized, for example, if the email address 235 is formed by concatenating first name "." last name "@sun.com." In this case, global attribute mapping data may indicate that email user 232's email address 235 is a concatenation of HR user 214's first name 216, HR user 214's last name 217, and "@sun.com." In one embodiment, a notation such as "HR user.first name+HR user.last name=email user.email address" may be used to indicate that email user's email address 235 may be impacted by a modification to either HR user 214's first name 216 or HR user 214's last name 217 or vice versa. For more information on global attribute mapping data, refer to U.S. patent application Ser. No. 10/767,084 by Ashwin J. Mathew and Amit P. Tripathi, filed on the same date as the present application and entitled "Global Attribute Mapping Data in a Distributed Enterprise Information System", the contents of which are incorporated herein.

Fractional Data Consolidation and Synchronization

Figure 3A:
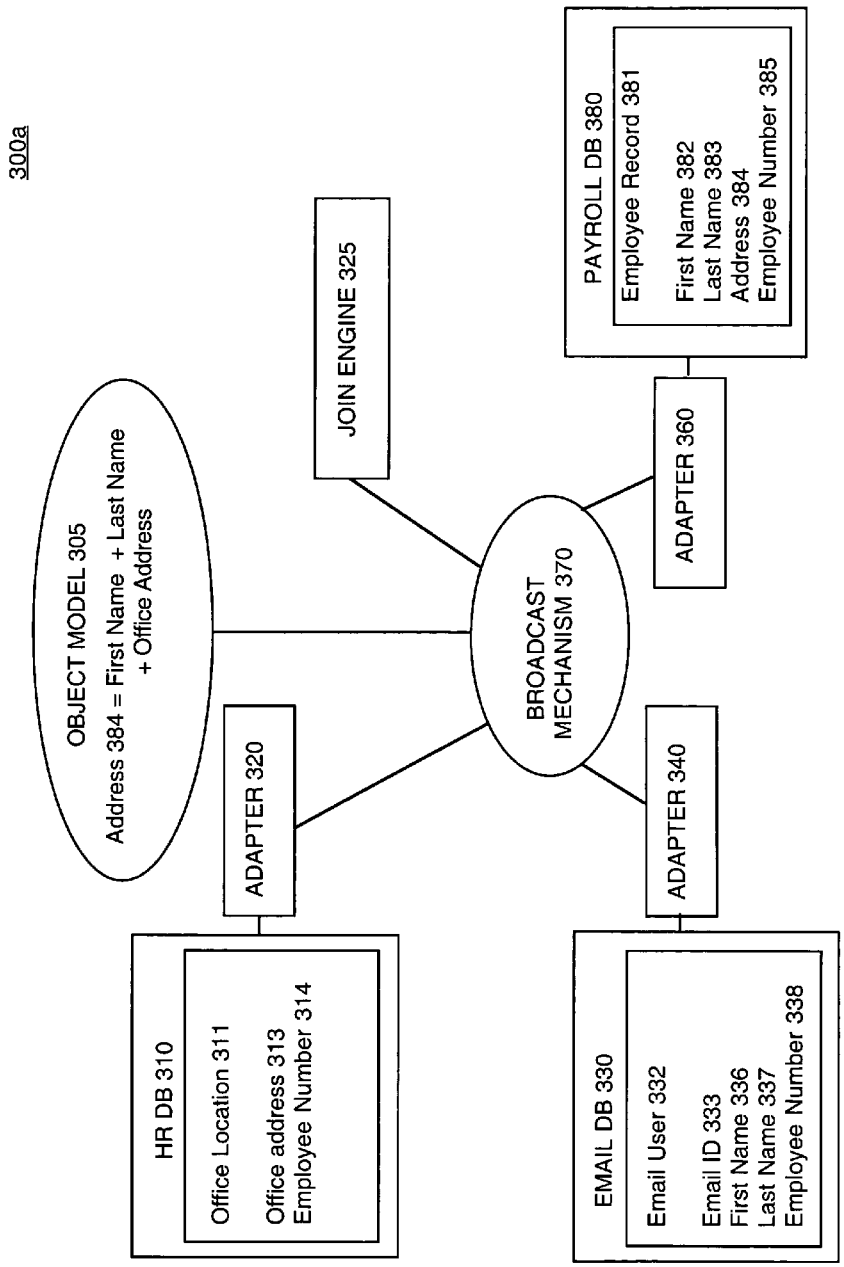
FIG. 3A is a block diagram depicting an exemplary peer-to-peer enterprise information system for synchronizing and consolidating information in accordance with an embodiment of the present invention.

FIG. 3A is a block diagram depicting an exemplary peer-to-peer enterprise information system 300a for synchronizing and consolidating information in accordance with an embodiment of the present invention. Enterprise information system 300a includes multiple source systems 310, 330 and 380, which store and maintain information (values for 313, 314, 333, 336, 337, 338, 382, 383, 384, 385) associated with instances of data types 311, 332 and 381.

For each data type entity in a database, there is a primary key attribute or combination of attributes (compound primary key) that may be used to uniquely identify the entity, according to one embodiment. In small databases this may be a name and address, or an employee number, e.g., Employee Number 385. For example, if the U.S. government maintains a database of all citizens, it could not possibly identify them uniquely by their first name, last name, or a combination thereof, as there would obviously be duplicates. However, the social security number is unique for every citizen and hence would qualify as a primary key for identifying any citizen, regardless of first name or last name. In the present embodiment, the primary key is Employee Number 314, 338, 385.

In one embodiment, change events or updates to the stored information may be synchronized fractionally across dependent data types by broadcasting the information on the peer-to-peer broadcast mechanism 370 as well as listening for and receiving the modified information at join engine peer 325 from broadcast mechanism 370.

According to one embodiment of the present invention, the globally available object model 305 of FIG. 3A stores attribute mapping data for obtaining attribute relationships and dependencies among data types across the enterprise information system.

In the present embodiment, modifications may be broadcast by adapters 320, 340 and 360 that are associated with source systems 310, 330 and 380. Adapters are peers in the peer-to-peer system. The adapters 310, 330 and 380 may also listen for and receive modified information that is broadcast. A source system broadcasting a modification to an attribute of a record may also simultaneously broadcast the entire record along with the attribute that changed. This is done so that subsequent queries for this information can be obviated.

Figure 3B:
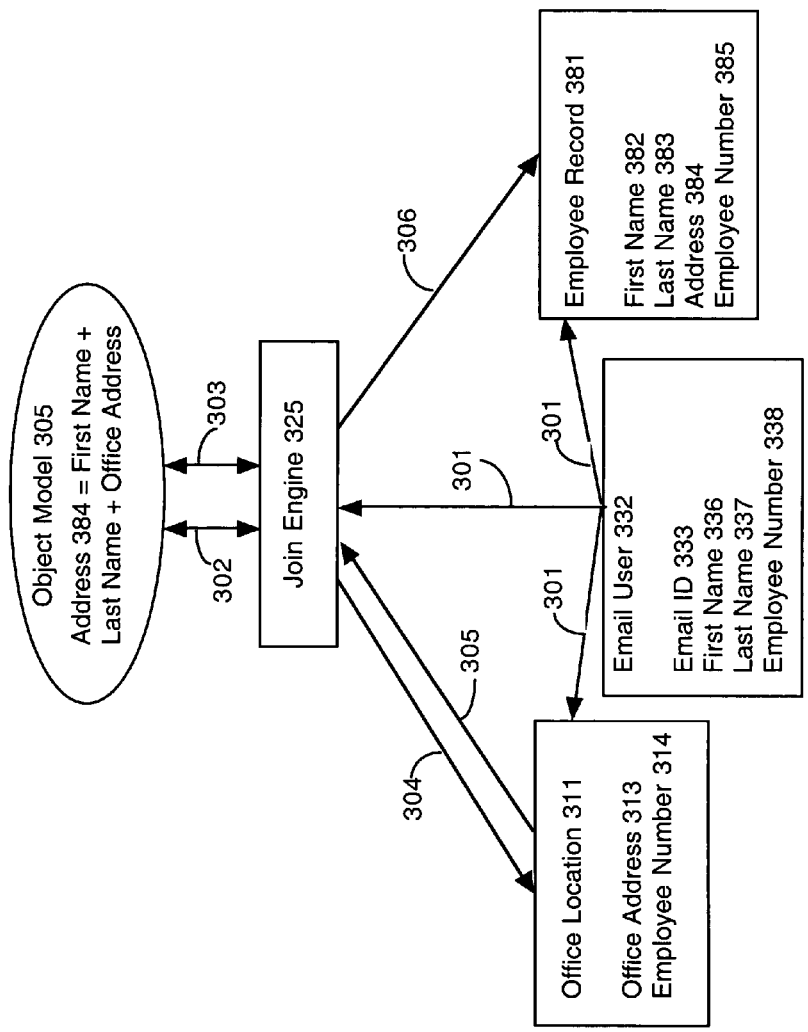
FIG. 3B is a data flow diagram illustrating an exemplary fractional data synchronization and consolidation resulting from a change event that may occur in accordance with an embodiment of the present invention.

FIG. 3A will be discussed in concert with FIG. 3B and FIG. 4 below. FIG. 3B is a data flow diagram 300b illustrating an exemplary fractional data synchronization and consolidation resulting from a change event that may occur in accordance with an embodiment of the present invention. FIG. 4 is a flow chart for an exemplary fractional data synchronization and consolidation resulting from a change event that may occur in a peer-to-peer based enterprise information system, according to an embodiment of the present invention. FIG. 4 will be discussed with reference to FIGS. 3A and 3B.

At step 410 of FIG. 4, according to one embodiment, the attribute "Last Name" 337 of Email User 332 changes. This change is published (301) to the peer-to-peer enterprise information system via adapter peer 340 associated with source Email DB 330 and broadcast mechanism 370. Along with the changed attribute, all other (unchanged) attributes 333, 336, 338 of the record may also be published in order to obviate a query for this data.

At step 420, in accordance with an embodiment of the present invention, join engine peer 325, listening to the broadcast channel for this data type, receives broadcast (301) and consults (302) Object Model 305 for dependent output entity attributes associated with "Last Name" 337. Namely, the join engine peer 325 determines those output data types that are based on the "Last Name" 337. In one embodiment, output data types or attributes are written as functions of the input data and dependencies can therefore be discovered in this fashion.

Still referring to FIGS. 3A, 3B and 4, in one embodiment, at step 430 of FIG. 4, join engine peer 325 determines that attribute "Address" 384 on output entity Employee Record 381 with primary key "Employee Number" 385 (the same value as "Employee Number" 338 at the source entity), residing on Payroll DB 380, needs to be formed. At step 440 of FIG. 4, join engine 325 again consults (303) Object Model 305 for other attributes required to form "Address" 384 in accordance with an embodiment of the present invention. Table 1 below shows a typical example of a possible attribute dependency.

Table 1

Attribute 'address' of Employee Record=f(Attribute 'FirstName' of EmailUser, Attribute 'LastName' of EmailUser, Attribute 'OfficeAddress' of OfficeLocation)

At step 450 of FIG. 4, according to one embodiment, join engine peer 325 determines that "Address" 384 is composed of "First Name," "Last Name" and "Office Address." Since the changed value of "Last Name" 337 was accompanied by all other attributes for that Email User 332 data type, the value of "First Name" 336 for the same source entity is also available. However, the value of "Office Address" is needed. Join engine peer 325, having determined the location of "Office Address" 313 from Object Model 305, then sends (304) a query to Office Location 311 on HR DB 310 for the value of "Office Address" 313.

Referring still to FIGS. 3A, 3B and 4, at step 460 of FIG. 4, join engine peer 325 receives (305) a response from Office Location 311 with the value of Office Address 313 according to an embodiment of the present invention. Join engine peer 325 then performs a data transformation to form the modified attribute "Address" 384. The data transformation entails automatically transforming the data change into a transformation language, e.g., XSLT or JAVA syntax. It is important to note that only the needed transformations, that is, the transformations needed to form the modified attribute set of the output entity, are performed. Furthermore, only those source entities that are required to form the output data are queried.

At step 470, according to one embodiment, join engine peer 325 publishes (306) the modified attribute set "Address" and primary key "Employee Number" to output entity Employee Record 381 via adapter peer 360 associated with Payroll DB 380. Primary key "Employee Number" is necessary for Payroll DB 380 to know where to store the modified value of "Address" 384.

Figure 5A:
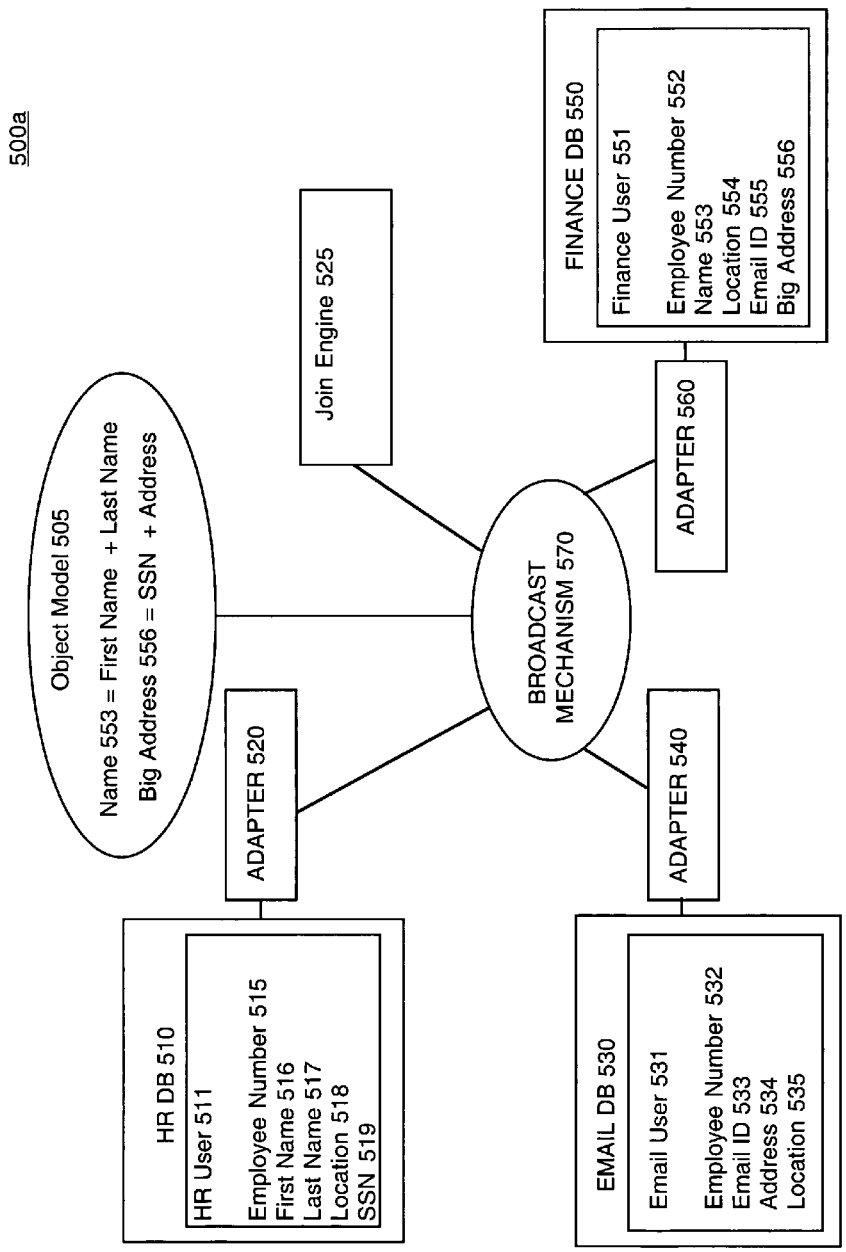
FIG. 5A is a block diagram depicting an exemplary peer-to-peer enterprise information system for synchronizing and consolidating information in accordance with an embodiment of the present invention.

FIG. 5A is a block diagram 500a depicting an exemplary peer-to-peer enterprise information system for synchronizing and consolidating information in accordance with another embodiment of the present invention. Enterprise information system 500a includes multiple source systems 510, 530 and 580, which store and maintain information (values for 515, 515, 517, 518, 519, 531, 532, 533, 534, 535, 552, 553, 554, 555, 556) associated with instances of data types 511, 531 and 551.

According to one embodiment, for each data type entity in a database, there is a primary key attribute or combination of attributes (compound primary key) that may be used to uniquely identify the entity. In the present embodiment, the primary key is Employee Number 515, 531, 552.

Change events or updates to the stored information may be synchronized fractionally across dependent data types by broadcasting the information on the peer-to-peer broadcast mechanism 570 as well as listening for and receiving the modified information at join engine peer 525 from broadcast mechanism 570 according to one embodiment.

Object model 505 of FIG. 5A stores attribute mapping data for obtaining attribute relationships and dependencies among data types across the enterprise information system in accordance with an embodiment of the present invention.

In the present embodiment, modifications may be broadcast by adapters 520, 540 and 560 that are associated with source systems 510, 530 and 550. Adapters are peers in the peer-to-peer system. The adapters 510, 530 and 550 may also listen for and receive modified information that is broadcast.

Figure 5B:
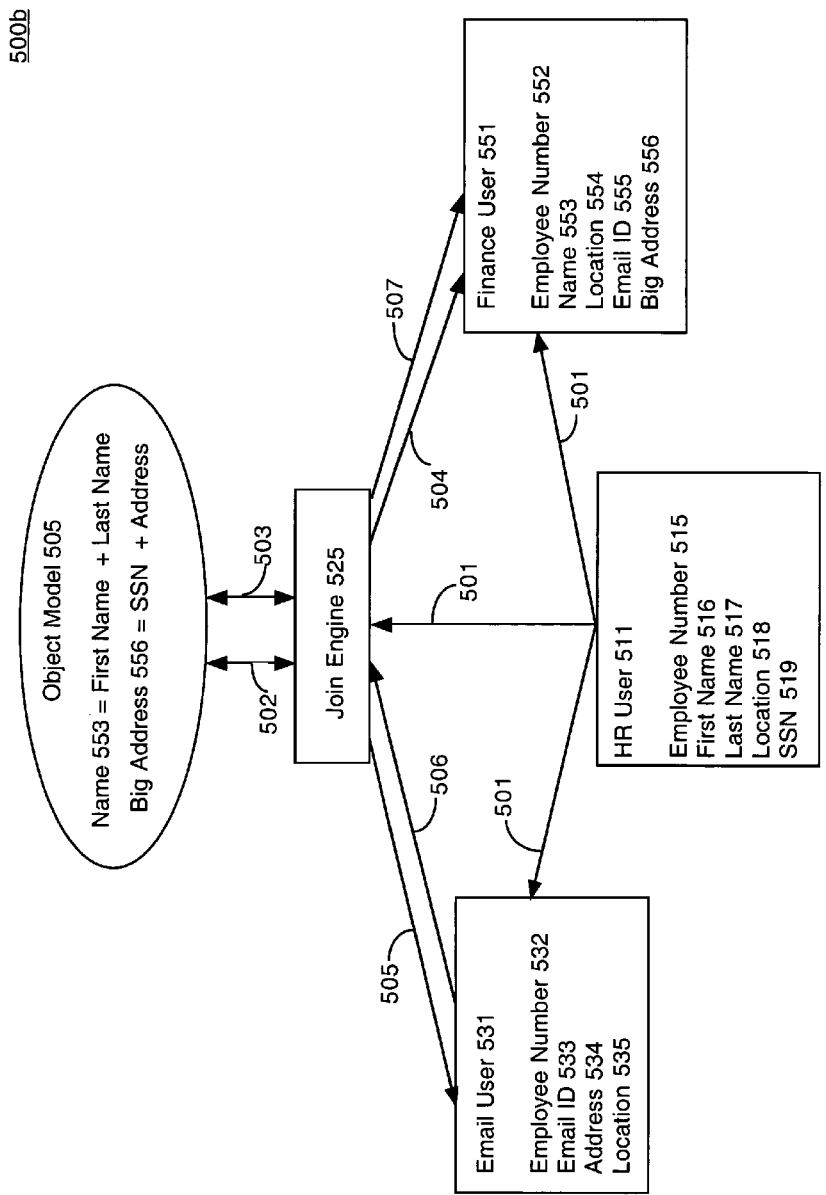
FIG. 5B is a data flow diagram illustrating an exemplary fractional data synchronization and consolidation resulting from multiple change events that may occur in accordance with an embodiment of the present invention.

FIG. 5A will be discussed in concert with FIG. 5B and FIGS. 6A and 6B below. FIG. 5B is a data flow diagram 500b illustrating exemplary fractional data synchronization and consolidation resulting from change events that may occur in accordance with an embodiment of the present invention. FIG. 6A is a flow chart 600a for an exemplary fractional data synchronization and consolidation resulting from multiple change events that may occur in a peer-to-peer based enterprise information system, according to one embodiment of the present invention. FIG. 6B is a flow chart 600b for an exemplary fractional data synchronization and consolidation resulting from a single change event that may occur in a peer-to-peer based enterprise information system, according to one embodiment of the present invention. FIGS. 6A and 6B will be discussed with reference to FIGS. 5A and 5B.

At step 610 of FIG. 6A, according to one embodiment, attributes "Last Name" 517 and SSN" 519 are changed on source entity HR User 511. The changed attributes, along with the other, unchanged attributes 515, 516, 518 of HR User 511 are published (501) to the peer-to-peer enterprise information system via adapter peer 520 associated with HR DB 510 of FIG. 5A and broadcast mechanism 570.

At step 620, in one embodiment join engine peer 525, listening on broadcast channels for HR User 511 receives (501) the broadcast. Join engine 525 then consults (502) object model 505 for dependent output entities. From the consultation with object model 505, at step 630 join engine 525 determines, in accordance with one embodiment, that "Name" 553 and "Big Address" 556 on dependent output entity Finance User 551 need to be formed.

It should be appreciated that "Name" 553 and "Big Address" 556 may exist on separate data systems. Also, there may be more than one output entity, and there may be multiple attributes affected. The present embodiment is only one example of data flow and changes resulting from a change to an existing entity in a peer-to-peer enterprise information system.

Still referring to FIGS. 5A, 5B and FIG. 6A, in one embodiment, at step 640, join engine peer 525 consults (503) object model 505 once again in order to determine other attributes needed to form "Name 553 and "Big Address" 556. From the consultation, according to the present embodiment, join engine 525 determines at step 650 of FIG. 6A, that "First Name" 516 is needed for "Name" 553 and "Address" 534 is needed for "Big Address"556. Join engine 525 received "First Name" 516 (one of the "other HR attributes) from the publication (501) of the changed attributes.

Therefore, according to one embodiment, at step 660 join engine 525 may perform a transformation to join "First Name" 516 and "Last Name" 517 to form "Name" 553. Once formed, "Name" 553 is published (504), along with primary key 552, Finance User 551 via adapter peer 560 associated with Finance DB 550.

At step 670 of FIG. 6A, according to an embodiment of the present invention, join engine peer 525 sends (505) a query to Email User 531 for "Address" 534. The join engine 525 has knowledge of the specific entity (Email User 531) possessing the needed attribute, "Address" 534, from consulting with object model 505. It should be noted that join engine peer 525 does not need to query the source entities for "First Name" as it already has it. Only the queries that are required to form the output entity are performed.

Referring still to FIGS. 5A, 5B and FIG. 6A, at step 680, join engine 525 receives (506) "Address" 534 from Email User 531, performs a data transformation to form "Big Address" 556, and publishes (507) "Big Address" 556 along with primary key "Employee Number" 552 to Finance User 551 via adapter peer 560. The data transformation entails automatically transforming the data change into a transformation language, e.g., XSLT or JAVA syntax. It is important to note that only the needed transformations, that is, the transformations needed to form the modified attribute set of the output entity, are performed.

FIG. 6B is a flow chart 600b for an exemplary fractional data synchronization and consolidation resulting from a single change event that may occur in a peer-to-peer based EIS, e.g., EIS 500a of FIG. 5A, according to one embodiment of the present invention.

At step 685 of FIG. 6B, according to one embodiment, attribute "Last Name" 517 is changed on source entity HR User 511. According to one embodiment, the changed attribute, along with the other, unchanged attributes 515, 516, 518 and 519 of HR User 511 (as an optimization) are published (501) to the peer-to-peer enterprise information system via adapter peer 520 associated with HR DB 510 of FIG. 5A and broadcast mechanism 570. In another embodiment, the unchanged attributes 515, 516, 518 and 519 may not be published along with the changed attribute "Last Name" 517.

At step 687, in one embodiment join engine peer 525, listening on broadcast channels for HR User 511 receives (501) the broadcast. Join engine 525 then consults (502) object model 505 for dependent output entities. From the consultation with object model 505, at step 6689 join engine 525 determines, in accordance with one embodiment, that "Name" 553 on dependent output entity Finance User 551 needs to be formed.

It should be appreciated that "Name" 553 may exist on more than one output entity, and there may be multiple attributes affected. The present embodiment is only one example of data flow and changes resulting from a change to an existing entity in a peer-to-peer enterprise information system.

Still referring to FIGS. 5A, 5B and FIG. 6B, in one embodiment, at step 691, join engine peer 525 consults (503) object model 505 once again in order to determine other attributes needed to form "Name 553. From the consultation, according to the present embodiment, join engine 525 determines that "First Name" 516 is needed for "Name" 553. According to one embodiment (optimization) Join engine 525 received "First Name" 516 (one of the "other HR attributes) from the publication (501) of the changed attributes. In this embodiment, at step 695 join engine 525 may perform a transformation to join "First Name" 516 and "Last Name" 517 to form "Name" 553. Once formed, "Name" 553 is published (504), along with primary key 552, to Finance User 551 via adapter peer 560 associated with Finance DB 550.

According to another embodiment, if the unchanged attributes are not published along with the changed attribute at step 685, Join Engine 525 may need to send a query to HR User 511 to obtain "First Name" 516 associated with "Last Name" 517 in order to form "Name" 553. It should be appreciated that only the source entities having attributes that are needed to form a dependent attribute or entity are queried. Join Engine 525, in the present embodiment, never needs to query Email User 531, as there are no changes for which Email User's 531 attributes have any dependency.

Figure 7:
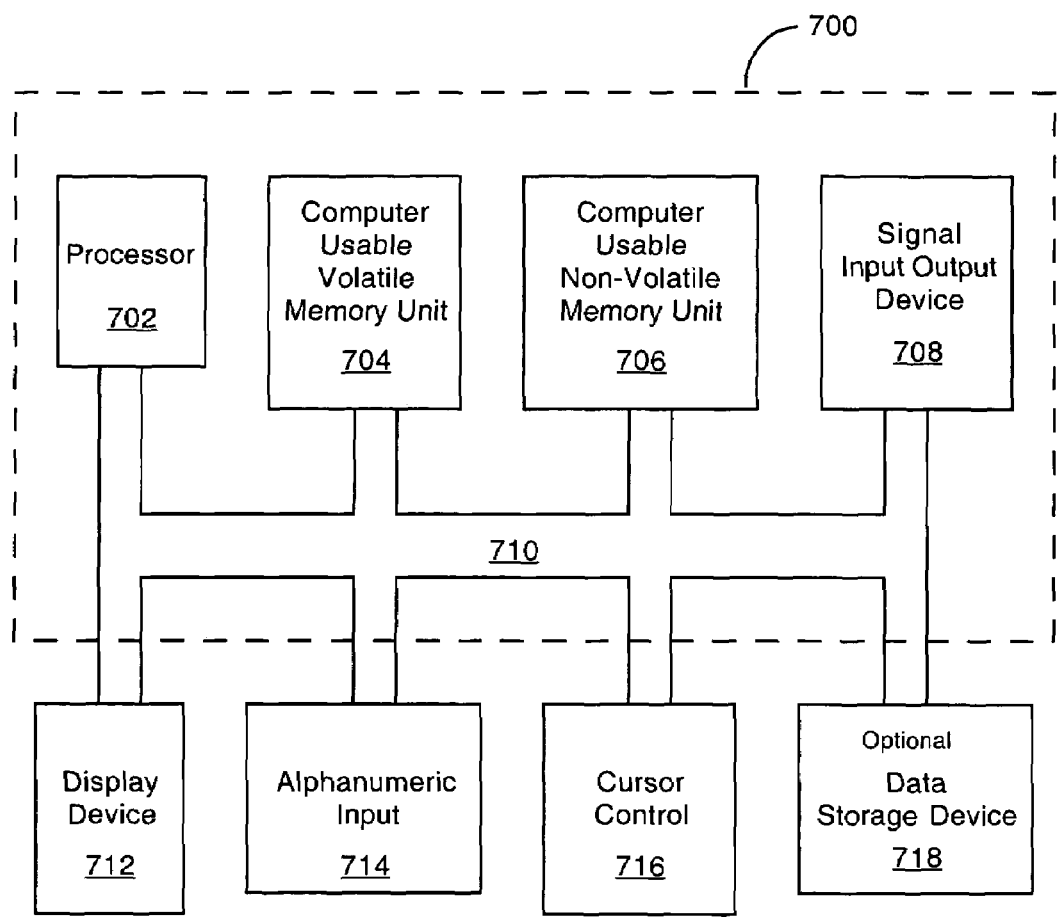
FIG. 7 is a block diagram of an exemplary computer system upon which embodiments of the present invention may be practiced.

Embodiments of the present invention may be comprised of computer-readable and computer-executable instructions that reside, for example, in computer-useable media of an electronic system, such as a peer system, a host computer system or an embedded system which may serve as a peer platform. With reference now to FIG. 7, a block diagram of an embodiment of an exemplary computer system 700 used in accordance with the present invention. It should be appreciated that system 700 is not strictly limited to be a computer system. As such, system 700 of the present embodiment is well suited to be any type of computing device (e.g., server computer, embedded system, portable computing device, desktop computer, etc.). Within the following discussions of the present invention, certain processes and steps are discussed that are realized, in one embodiment, as a series of instructions (e.g., software program) that reside within computer readable memory units of computer system 700 and executed by a processor(s) of system 700. When executed, the instructions cause computer 500 to perform specific actions and exhibit specific behavior that is described in detail herein.

Computer system 700 of FIG. 7 comprises an address/data bus 710 for communicating information, one or more central processors 702 coupled with bus 710 for processing information and instructions. Central processor unit(s) 702 may be a microprocessor or any other type of processor. The computer 700 also includes data storage features such as a computer usable volatile memory unit 704 (e.g., random access memory, static RAM, dynamic RAM, etc.) coupled with bus 710 for storing information and instructions for central processor(s) 702, a computer usable non-volatile memory unit 706 (e.g., read only memory, programmable ROM, flash memory, EPROM, EEPROM, etc.) coupled with bus 710 for storing static information and instructions for processor(s) 702. System 700 also includes one or more signal generating and receiving devices 708 coupled with bus 710 for enabling system 700 to interface with other electronic devices and computer systems. The communication interface(s) 708 of the present embodiment may include wired and/or wireless communication technology.

Computer system 700 may include an optional alphanumeric input device 714 including alphanumeric and function keys coupled to the bus 710 for communicating information and command selections to the central processor(s) 702. The computer 700 includes an optional cursor control or cursor directing device 716 coupled to the bus 710 for communicating user input information and command selections to the central processor(s) 702. The cursor-directing device 716 may be implemented using a number of well known devices such as a mouse, a track-ball, a track-pad, an optical tracking device, and a touch screen, among others.

The system 700 of FIG. 7 may also include one or more optional computer usable data storage devices 718 such as a magnetic or optical disk and disk drive (e.g., hard drive or floppy diskette) coupled with bus 710 for storing information and instructions. A display device 712 is coupled to bus 710 of system 700 for displaying textual or graphical information, e.g., a graphical user interface, video and/or graphics. It should be appreciated that display device 712 may be a cathode ray tube (CRT), flat panel liquid crystal display (LCD), field emission display (FED), plasma display or any other display device suitable for displaying video and/or graphic images and alphanumeric characters recognizable to a user.

Referring again to FIG. 2, in the present embodiment, the source systems 210, 230, 280, 250 and adapters 220, 240, 270, 250 may be executed on computer systems, such as computer system 700. Similarly, the join engines 222 and 262 and object model 295 may be executed on computer systems, such as computer system 500.

Thus, the present invention provides, in various embodiments, a method and system for fractional data synchronization and consolidation in an enterprise information system. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An automated method of updating data within a peer-to-peer enterprise information system comprising:
publishing a data change from a first source system over a broadcast channel, wherein said data change is of a first data type;
in response to said data change, a join engine peer accessing a global attribute object model to identify a second data type and additional attributes of said second data type, wherein said global attribute object model defines a first dependency between at least one attribute of said first data type and at least one attribute of a third data type and a second dependency between said additional attributes and attributes of said third data type, wherein said first dependency requires synchronization of said third data type with said data change;
using a query to obtain said additional attributes from a second source system, wherein said query is generated using said global attribute object model;
generating a modified attribute set comprising said additional attributes and said data change; and
publishing said modified attribute set to a third source system, wherein said third source system is associated with said third data type, wherein said third data type is synchronized, as specified in said first dependency, with said data change in said modified attribute set.

2. A method as described in claim 1 wherein said broadcast channel is associated with an adapter peer for said first source system for said first data type.

3. A method as described in claim 1 wherein said data change includes at least one changed attribute and all other attributes of said first data type.

4. A method as described in claim 3 wherein, if said additional attributes of said third data type are included within said all other attributes of said first data type, said join engine peer forms said modified attribute set directly from said data change.

5. A method as described in claim 1 wherein said global attribute object model maps dependencies between attributes of said third data type and attributes of said first data type.

6. A method as described in claim 1 wherein said generating said modified attribute set comprises performing a data transformation.

7. A method as described in claim 6 further comprising performing a data transformation for said data change.

8. A method as described in claim 7 wherein said performing a data transformation is by said join engine peer.

9. A method as described in claim 8 wherein said performing a data transformation comprises automatically transforming said data change into a transformation script of a transformation language for implementation by said join engine peer.

10. A method as described in claim 9 wherein said transformation language is compliant with XSLT syntax.

11. A method as described in claim 9 wherein said transformation language is compliant with JAVA language syntax.

12. An automated method of updating data within a peer-to-peer enterprise information system comprising:
in response to a data change of a first data type broadcast over a broadcast channel, a join engine peer accessing a global attribute object model to identify a second data type and additional attributes of said second data type, wherein said global attribute object model defines a first dependency between at least one attribute of said first data type and at least one attribute of a third data type and a second dependency between said additional attributes and attributes of said third data type, wherein said first dependency requires synchronization of said third data type with said data change;
responsive to identifying said second data type, using said global attribute object model to generate a query for retrieving said additional attributes from a first source system;
transmitting said query to said first source system;
responsive to a reply from said first source system, performing a data transformation to generate a modified attribute set, wherein said modified attribute set comprises said additional attributes and said data change;
publishing said modified attribute set to a second source system, wherein said second source system is associated with said third data type, wherein said third data type is synchronized, as specified in said first dependency, with said data change in said modified attribute set.

13. A method as described in claim 12 wherein said broadcast channel is associated with an adapter peer for a third source system for said first data type.

14. A method as described in claim 12 wherein said data change includes at least one changed attribute and all other attributes of said first data type.

15. A method as described in claim 14 wherein, if said additional attributes of said third data type are included within said all other attributes of said first data type, said join engine peer forms said modified attribute set directly from said data change.

16. A method as described in claim 12 wherein said global attribute object model maps dependencies between attributes of said third data type and attributes of said first data type.

17. A method as described in claim 12 wherein said performing a data transformation comprises automatically transforming said data change into a transformation script of a transformation language for implementation by said join engine peer.

18. A method as described in claim 17 wherein said transformation language is compliant with XSLT syntax.

19. A method as described in claim 17 wherein said transformation language is compliant with JAVA language syntax.

20. A computer readable medium containing software instructions embodied therein for causing a computer system to perform a method for updating data within a peer-to-peer system comprising, the method comprising:

publishing a data change of a first data type over a broadcast channel;

in response to said data change, a join engine peer accessing a global attribute object model to identify a second data type and additional attributes of said second data type, wherein said global attribute object model defines a first dependency between at least one attribute of said first data type and at least one attribute of a third data type and a second dependency between said additional attributes and attributes of said third data type, wherein said first dependency requires synchronization of said third data type with said data change;

using said global attribute object model to generate a query for retrieving said additional attributes from a first source system;

transmitting said query to said first source system;

responsive to a reply from the first source system, generating a modified attribute set and publishing said modified attribute set to a third source system associated with said third data type, wherein said modified attribute set comprises said additional attributes and said data change, and wherein said third data type is synchronized, as specified in said first dependency, with said data change in said modified attribute set.

21. The computer readable medium of claim 20, wherein said broadcast channel is associated with an adapter peer for a third source system for said first data type.

22. The computer readable medium of claim 20, wherein said data change includes at least one changed attribute and all other attributes of said first data type.

23. The computer readable medium of claim 22, wherein, if said additional attributes of said third data type are included within said all other attributes of said first data type, said join engine peer forms said modified attribute set directly from said data change.

24. The computer readable medium of claim 20, wherein said global attribute object model maps dependencies between attributes of said third data type and attributes of said first data type.

25. The computer readable medium of claim 20, wherein said generating said modified attribute set comprises performing a data transformation.

26. The computer readable medium of claim 25, further comprising performing a data transformation for said data change.

27. The computer readable medium of claim 26, wherein said performing a data transformation is by said join engine peer.

28. The computer readable medium of claim 27, wherein said performing a data transformation comprises automatically transforming said data change into a transformation script of a transformation language for implementation by said join engine peer.

29. The computer readable medium of claim 28, wherein said transformation language is compliant with XSLT syntax.

30. The computer readable medium of claim 28, wherein said transformation language is compliant with JAVA language syntax.

* * * * *